United States Patent
Gopalan

(10) Patent No.: US 6,428,649 B1
(45) Date of Patent: *Aug. 6, 2002

(54) METHOD FOR FORMING AN AUTOMOTIVE VEHICLE WEATHERSEAL HAVING A METAL SUBSTRATE WITH BONDED ELASTOMERIC LAYER

(75) Inventor: Krishnamachari Gopalan, Knoxville, TN (US)

(73) Assignee: Schlegel Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/597,184

(22) Filed: Jun. 20, 2000

(51) Int. Cl.[7] .............................. E06B 7/16; B60J 10/02
(52) U.S. Cl. .............................. 156/244.24; 156/307.7; 49/475.1; 49/490.1; 296/93; 428/122; 264/171.15
(58) Field of Search .................................. 428/461, 462, 428/463, 457, 465, 466, 500, 501, 514–519, 122; 525/75; 156/910, 244.11, 244.24, 307.7; 296/93; 49/475.1, 490.1; 264/171.15

(56) References Cited

U.S. PATENT DOCUMENTS

| 3,657,046 A |   | 4/1972  | Furukawa, et al. |
|-------------|---|---------|------------------|
| 3,998,992 A | * | 12/1976 | Nakamura ................... 428/451 |
| 4,062,997 A | * | 12/1977 | Hotta et al. .................. 428/378 |
| 5,182,141 A |   | 1/1993  | Borys et al. |
| 5,510,191 A |   | 4/1996  | Higashira, et al. |
| 5,521,248 A | * | 5/1996  | Drake et al. ................... 525/75 |
| 5,548,012 A |   | 8/1996  | Yomamoto, et al. |
| 5,564,249 A |   | 10/1996 | Borys et al. |
| 5,605,736 A |   | 2/1997  | Zohar et al. |
| 5,628,150 A |   | 5/1997  | Mesnel |
| 5,647,939 A |   | 7/1997  | Gee et al. |

FOREIGN PATENT DOCUMENTS

| EP | 0482740  | 4/1992 |
| JP | 11020479 | 1/1999 |
| JP | 11207859 | 3/1999 |

* cited by examiner

Primary Examiner—Rena L. Dye
(74) Attorney, Agent, or Firm—Brian B. Shaw, Esq.; Stephen B. Salai, Esq.; Harter, Secrest & Emery LLP

(57) ABSTRACT

A laminate having a metal reinforcement and a bonding veneer is disclosed, wherein the bonding veneer is a peroxide cured rubber including at least one of a polybutadiene and (meth)acrylate. A feature layer is formed on the bonding veneer and can be any of a variety of cross-linkable materials such as EPDM and EPM.

42 Claims, 1 Drawing Sheet

METHOD FOR FORMING AN AUTOMOTIVE VEHICLE WEATHERSEAL HAVING A METAL SUBSTRATE WITH BONDED ELASTOMERIC LAYER

FIELD OF THE INVENTION

The present invention relates to metal substrates and attached elastomeric layers and, more particularly, to glass guidance components for use in automotive vehicles, wherein the component includes a metal reinforcement with a thermosetting bonding veneer which is overlaid by a second thermosetting material. More specifically, the present invention encompasses a metal reinforcement having a peroxide cured thermoset bonding veneer bonded to the metal and a sulfur cured rubber overlying the bonding veneer.

BACKGROUND OF THE INVENTION

Polymer coated metals are advantageously used in the automotive industry. Metal reinforcement in a seal provides rigidity for flush glazing systems. An elastomeric extrusion typically covers the metal to protect adjacent surfaces and the metal itself. The elastomeric extrusion preferably permits the resiliency and conformability of the metal reinforcement while enhancing resistance to the elements including extreme temperature fluctuations and providing an interface with a panel. The elastomeric extrusion needs a heat activated thermosetting adhesive to bond to the metal reinforcement.

Typically, the process of providing a metal strip with an EPDM coating begins at a coil coating facility where the metal is cleaned, dried and coated with a primer. Solvents of the primer are evaporated and the coated metal is baked to leave a layer of primer on the metal. An adhesive such as a heat activatable adhesive is then applied to the primer. The adhesive is best activated at time of vulcanization of the profile.

The use of adhesives and primers and their associated processing steps adds a significant cost factor to the end product. Alternatively, the application of the adhesive to the metal can be done in line during the extrusion process. Further, as each of these steps may encounter variances, there is the potential for increased scrap. That is, the additional coatings required to employ the adhesive, introduce further variances in the process and may lower the effective manufacturing rate. Thermosetting heat activated adhesives tend to flake off at the roll forming station resulting in blisters.

Therefore, the need exists for a multi-layer component having an elastomeric material attached to a metal, wherein delamination is reduced. The need also exists for a seal having a metal bonded to an elastomeric material, wherein the need for adhesives and solvents during manufacturing is reduced. The need also remains for a glass guidance component having an EPDM sufficiently bonded relative to a metal carrier to preclude delamination during use, without requiring expensive adhesives or processing steps.

SUMMARY OF THE INVENTION

The present invention provides a laminate having a metal layer integrally bonded to a peroxide cured rubber bonding veneer having a cross linked EPDM bonded to the bonding veneer.

In a particular configuration, the present invention provides a glass guidance component having a metal reinforcement, a peroxide cured rubber bonding veneer integrally bonded to and encapsulating the metal reinforcement and a cross linked EPDM bonded to the bonding veneer.

The present construction sufficiently adheres the bonding veneer to the metal reinforcement to substantially preclude a non-destructive separation. As the outer EPDM layer is generally compatible with the bonding veneer, the EPDM outer layer may be disposed on the bonding layer and cured in a traditional manner.

DETAILED DESCRIPTION OF THE PREFERRED EMBODIMENT

Figure 1:
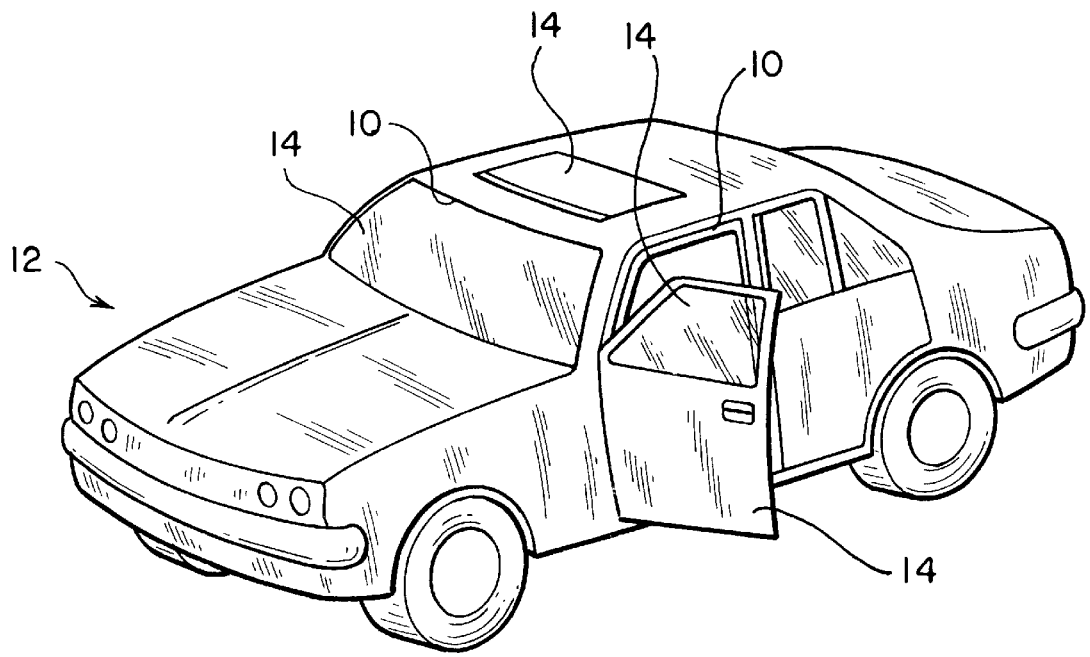
FIG. 1 is a prospective view of an automobile showing location of the present invention.

Referring to FIG. 1, the present invention includes a laminate or composite 10 which may be employed in a vehicle 12 as a glass guidance component or a sealing structure. The composite 10 can be constructed to provide a contacting, guiding or sealing interface with a panel 14.

The panel 14 can be any of a variety of materials and does not limit the present invention. For example, the panel 14 may be glass, metal or a composite which is painted, surface treated or bare. In the operating environment, it is contemplated the panel 14 is repeatedly brought into and out of engagement with the composite 10. The engagement of the panel 14 and the composite 10 may result from motion of the panel relative to the composite, or alternatively motion of the composite relative to the panel.

Figure 2:
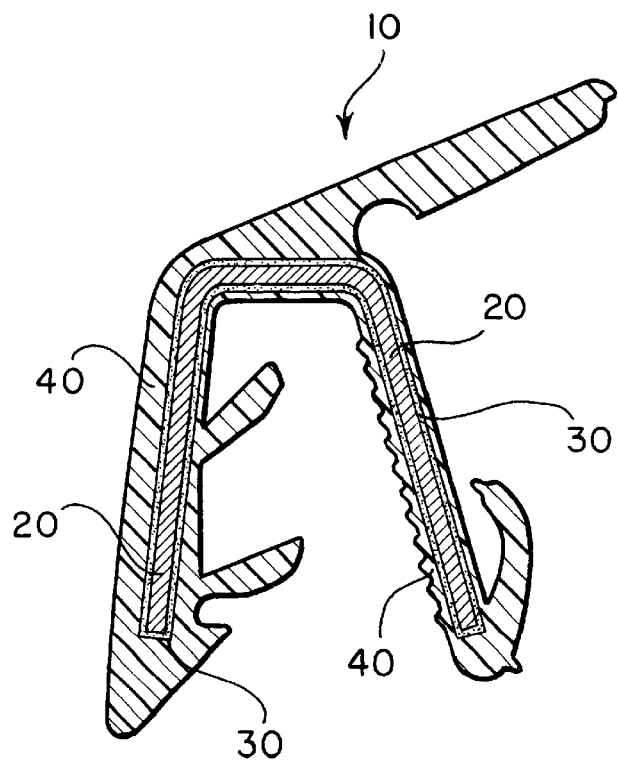
FIG. 2 is a cross sectional view of a glass guidance component.

For clarity in the description, the composite 10, will be described in terms of glass guidance component. Referring to FIG. 2, the glass guidance component configuration of the present invention includes a reinforcement 20, a bonding veneer 30 bonded to at least a portion of the reinforcement and a feature layer 40 attached to the bonding veneer. Typically, the composite 10 has a given cross sectional profile and a length.

Reinforcement

The reinforcement 20 is preferably a metal such as aluminum, steel, stainless steel, galvanized steel or similar alloys. Generally, the reinforcement 20 functions as a carrier and extends the full length of the glass guidance component. The reinforcement 20 may be a stamped, molded, poured or extruded construction. The specific metal and thickness of the reinforcement 20 is at least partially determined by the intended use of the composite 10.

Bonding Veneer

The bonding veneer 30 is bonded to the reinforcement 20. Preferably, the bonding veneer 30 encapsulates the reinforcement 20 and has a sufficient thickness to preclude exposure of the reinforcement and thus provides a basis for the feature layer 40. The thickness of the bonding veneer 30 is as thin as possible to reduce material costs, however, the bonding veneer has a sufficient thickness to accommodate line processing variations and stretch bending so as to maintain an encapsulation of the reinforcement 20. It has been found a thickness range of 0.2–0.5 mm has been satisfactory with a typical thickness of 0.35 mm being sufficient for the bonding veneer 30. Preferably, the bonding veneer 30 includes at least one of a (meth)acrylate coagent or maleinized polybutadiene in a peroxide cured material. It has been found that this compound bonds directly to the metal reinforcement 20.

While the (meth)acrylate coagent and/or maleinized polybutadiene can be employed in sulfur cross-linkable rubber formulations in the bonding veneer 30, it has been found that a higher bond strength is obtained in a peroxide curable formulation. It is believed the peroxide generates free radicals and polymerizes the (meth)acrylate coagent and the maleinized polybutadiene to form a thermoset polymeric adhesive on the metal surface in situ. The strength of the adhesive free bond between the reinforcement 20 and the bonding veneer 30 has been found to be a rubber tear bond. That is, non-destructive separation of the bonding veneer 30 from the reinforcement 20 is precluded for the intended operating parameters of the composite.

Typically, the use of peroxide cured formulations in hot air curing, or media beds using hot air to cure, leads to an undesirable tacky surface. Therefore, the present invention employs the feature layer 40 on top of the bonding veneer 30, wherein the feature layer includes a conventional sulfur curable rubber extrusion compound, typically employed in conventional glass run channels. The feature layer 40 also serves to protect the bonding veneer 30 from oxidation.

The bonding veneer 30 includes a polybutadiene and preferably liquid vinyl 1,2 polybutadiene (such as Ricobond 1756) forming 80% to 10% of the elastomer portion; carbon black at for example 100 phr (parts per hundred rubber); an oil; a desiccant; and cross linking initiators such as dicumyl peroxide at a 70% concentration in a range of approximately 2 phr to 15 phr and preferably at 4 phr; Saret 633 in a range of approximately 2 phr to 20 phr, preferably at 15 phr; and Rhenogran (TAC, Tri Allyl Cynaurate) at 50% concentration in a range of 0 to 5 phr and preferably at 3 phr.

Typical polybutadienes include: trans-1,4 polybutadiene; isotactic 1,2 polybutadiene; syndiotactic 1,2 polybutadiene; maleated polybutadiene and vinyl 1,2 polybutadiene.

In addition, the bonding veneer 30 may include insulating fillers such as white fillers, of which an example is silane treated clay in a sufficient quantity to substantially preclude galvanic corrosion of the reinforcement. The insulating fillers act to inhibit electrical transmission through the bonding veneer 30. That is, the bonding veneer 30 insulates the reinforcement 20. Thus, the bonding veneer 30 may be constructed to serve the bonding function, or serve the bonding function as well as an insulating function.

| A typical colored bonding veneer includes: | |
|---|---|
| Constituent | Amount (phr) |
| Buna 2370 | 90 |
| Ricobond ® 1756 | 10 |
| Burgess KE | 100 |
| PB 1100 | 6.5 |
| CaO | 20 |
| Dicumyl Peroxide (70%) | 4.3 |
| Rhenogran (TAC) 50% | 3 |
| Saret 633 | 15 |
| Akrosperse ® E-6724 | 5 | where Burgess KE is a calcined clay surface modified with an organofunctional silane, specifically vinyl silane.

As approximately 95% of the relevant industry is believed to employ hot airbed curing of similar extrudates, the use of the bonding veneer 30 which is covered by a traditional EPDM or EPM feature layer 40 allows compatibility with the vast majority of manufacturing facilities.

Feature Layer

The feature layer 40 is any cross-linkable elastomer such as typical EPDM or EPM. The feature layer 40 can be any ethylene-based polymer like polyolefin elastomers or any peroxide vulcanizable elastomers like SBR and NBR, as well as natural rubber.

| A suitable feature layer 40 includes: | |
|---|---|
| Constituent | Amount |
| Buna EP 2370 (85 phr) | 20%–80% |
| Ethylene | 40%–80% |
| ENB | 0%–9.5% |
| DCPD | 0%–6% |

Manufacture

In manufacture, the reinforcement 20 is formed and cleaned. The starting metal reinforcement 20 can be an aluminum strip or ribbon. It would also be possible to similarly roughen the aluminum substrate used in the above example, although a satisfactory product can be produced without the application of a roughener. A flame treatment is recommended to remove surface oils. The metal reinforcement 20 is then roll formed to a desired shape.

The reinforcement 20 and bonding veneer 30 are then passed through a die where the bonding veneer is passed from an extruder and deposited onto the reinforcement. Substantially simultaneously, or downstream, the feature layer 40 is extruded onto the exposed surface of the bonding veneer 30. Typically, the extruded rubber of the feature layer 40 is then passed through a hot airbed or other curing mediums to cure as known in the industry.

Therefore, the present invention provides a solventless and adhesive free bond between a metal reinforcement or core and a rubber layer, wherein the rubber layer readily bonds to alternative elastomeric materials.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims which scope is to be accorded the broadest interpretation so as to encompass all such modifications and equivalent structures.

What is claimed is:

1. A method of forming a weatherseal for an automotive vehicle, comprising:
    (a) extruding an uncured peroxide curable rubber bonding layer to contact a surface of a metal reinforcement, the uncured peroxide curable rubber bonding layer including one of a polybutadiene and (meth)acrylate;
    (b) extruding an uncured sulfur curable rubber layer to overlie the uncured peroxide curable rubber bonding layer to form an extrudate; and
    (c) curing the extrudate to bond the peroxide curable rubber bonding layer to the metal reinforcement and bond the sulfur curable rubber layer to the peroxide curable rubber bonding layer.

2. The method of claim 1, further comprising curing the extrudate to preclude non destructive separation of the peroxide curable rubber bonding layer from the metal reinforcement.

3. The method of claim 1, further comprising substantially simultaneously extruding the uncured sulfur curable rubber layer and the uncured peroxide curable rubber bonding layer.

4. The method of claim 1, further comprising extruding the uncured sulfur curable rubber layer downstream of extruding the uncured peroxide curable rubber bonding layer.

5. The method of claim 1, wherein curing the extrudate includes heating the extrudate.

6. The method of claim 1, wherein curing the extrudate includes exposing the extrudate to heated air.

7. The method of claim 1, further comprising extruding the uncured peroxide curable rubber bonding layer to contact a clean surface of the metal reinforcement.

8. The method of claim 1, further comprising extruding the uncured sulfur curable rubber layer to directly contact the uncured peroxide curable rubber bonding layer.

9. The method of claim 1, further comprising including both a polybutadiene and (meth)acrylate in the uncured peroxide curable rubber bonding layer.

10. The method of claim 1, further comprising formulating the uncured peroxide curable rubber bonding layer to reduce a galvanic corrosion of the metal reinforcement.

11. The method of claim 1, further comprising encapsulating the metal reinforcement with the uncured peroxide curable rubber bonding layer.

12. The method of claim 1, further comprising encapsulating the uncured peroxide curable rubber bonding layer with the uncured sulfur curable rubber layer.

13. The method of claim 1, further comprising employing maleinated polybutadiene in the uncured peroxide curable rubber bonding layer.

14. The method of claim 1, further comprising employing one of a steel, stainless steel, aluminum or a galvanized steel as the metal reinforcement.

15. A method of forming a weatherseal for an automotive vehicle, comprising:
   (a) extruding an uncured peroxide curable rubber layer onto a metal reinforcement, the uncured peroxide curable rubber layer including one of a polybutadiene and (meth)acrylate;
   (b) extruding an uncured sulfur curable rubber layer to overlie the uncured peroxide curable rubber layer to form an extrudate; and
   (c) curing the extrudate.

16. The method of claim 15, further comprising substantially simultaneously extruding the uncured sulfur curable rubber layer and the uncured peroxide curable rubber layer.

17. The method of claim 15, further comprising extruding the uncured sulfur curable rubber layer downstream of extruding the uncured peroxide curable rubber layer.

18. The method of claim 15, wherein curing the extrudate includes heating the extrudate.

19. The method of claim 15, wherein curing the extrudate includes exposing the extrudate to heated air.

20. The method of claim 15, further comprising extruding the uncured peroxide curable rubber layer to directly contact the metal reinforcement.

21. The method of claim 15, further comprising extruding the uncured sulfur curable rubber layer to directly contact the uncured peroxide curable rubber layer.

22. The method of claim 15, further comprising curing the extrudate to bond the peroxide curable rubber layer to the metal reinforcement and bond the sulfur curable rubber layer to the peroxide curable rubber layer.

23. The method of claim 15, further comprising including both a polybutadiene and (meth)acrylate in the uncured peroxide curable rubber layer.

24. The method of claim 15, further comprising formulating the uncured peroxide curable rubber layer to reduce a galvanic corrosion of the metal reinforcement.

25. The method of claim 15, further comprising encapsulating the metal reinforcement with the uncured peroxide curable rubber layer.

26. The method of claim 15, further comprising encapsulating the uncured peroxide curable rubber layer with the uncured sulfur curable rubber layer.

27. The method of claim 15, further comprising employing maleinated polybutadiene in the uncured peroxide curable rubber layer.

28. The method of claim 15, further comprising employing one of a steel, stainless steel, aluminum or a galvanized steel as the metal reinforcement.

29. A method of forming a weatherseal for an automotive vehicle, comprising:
   (a) extruding an uncured peroxide curable rubber layer onto a metal reinforcement;
   (b) extruding an uncured sulfur curable rubber layer to overlie the uncured peroxide curable rubber layer to form an extrudate; and
   (c) curing the extrudate.

30. The method of claim 29, further comprising substantially simultaneously extruding the uncured sulfur curable rubber layer and the uncured peroxide curable rubber layer.

31. The method of claim 29, further comprising extruding the uncured sulfur curable rubber layer downstream of extruding the uncured peroxide curable rubber layer.

32. The method of claim 29, wherein curing the extrudate includes heating the extrudate.

33. The method of claim 29, wherein curing the extrudate includes exposing the extrudate to heated air.

34. The method of claim 29, further comprising directly contacting the uncured peroxide curable rubber layer and the metal reinforcement.

35. The method of claim 29, further comprising directly contacting the uncured sulfur curable rubber layer and the uncured peroxide curable rubber layer.

36. The method of claim 29, further comprising including one of a polybutadiene and (meth)acrylate in the uncured peroxide curable rubber layer.

37. The method of claim 29, further comprising including both a polybutadiene and (meth)acrylate in the uncured peroxide curable rubber layer.

38. The method of claim 29, further comprising formulating the uncured peroxide curable rubber layer to reduce a galvanic corrosion of the metal reinforcement.

39. The method of claim 29, further comprising encapsulating the metal reinforcement with the uncured peroxide curable rubber layer.

40. The method of claim 29, further comprising encapsulating the uncured peroxide curable rubber layer with the uncured sulfur curable rubber layer.

41. The method of claim 29, further comprising employing maleinated polybutadiene in the uncured peroxide curable rubber layer.

42. The method of claim 29, further comprising employing one of a steel, stainless steel, aluminum or a galvanized steel as the metal reinforcement.

* * * * *